United States Patent
Warzelhan et al.

(10) Patent No.: US 9,998,656 B2
(45) Date of Patent: Jun. 12, 2018

(54) MONITORING SYSTEM COMPRISING A REFLECTING DEVICE AND CORRESPONDENCE MODULE AND METHOD FOR SETTING UP THE MONITORING SYSTEM

(71) Applicant: Robert Bosch GmbH, Stuttgart (DE)

(72) Inventors: Jan Karl Warzelhan, Bad Salzdetfurth Ot Heinde (DE); Nicolas Cebron, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 374 days.

(21) Appl. No.: 14/797,524

(22) Filed: Jul. 13, 2015

(65) Prior Publication Data

US 2016/0021307 A1    Jan. 21, 2016

(30) Foreign Application Priority Data

Jul. 21, 2014 (DE) .................. 10 2014 214 089

(51) Int. Cl.
*H04N 7/18* (2006.01)
*H04N 5/232* (2006.01)

(52) U.S. Cl.
CPC ......... *H04N 5/23229* (2013.01); *H04N 5/232* (2013.01)

(58) Field of Classification Search
CPC .................. G06T 7/0042; G06T 5/006; G06T 2207/10016
USPC .................................................. 348/142–160
See application file for complete search history.

(56) References Cited

U.S. PATENT DOCUMENTS

| 8,570,373 B2* | 10/2013 | Variyath | G01S 5/02 348/143 |
| 2015/0310601 A1* | 10/2015 | Rodriguez | G06T 1/0007 348/150 |

FOREIGN PATENT DOCUMENTS

JP    2012235482    11/2012

* cited by examiner

*Primary Examiner* — Andy Rao
(74) *Attorney, Agent, or Firm* — Michael Best & Friedrich LLP

(57) ABSTRACT

A monitoring system for a monitoring area. The monitoring system includes a monitoring camera, a reflecting device, and a evaluator. The monitoring camera has a field of view 4 for capturing a first partial section of the monitoring area. The reflecting device is positioned in the field of view of the monitoring camera such that the monitoring camera captures a second partial section of the monitoring area, wherein the first and the second partial sections are positioned to overlap in a common partial section of the monitoring area, wherein a first image area a depicts the first partial section I and a second image area depicts the second partial section in the monitoring image. The evaluator is configured to identify at least one correspondence object in the first as and the second partial section.

11 Claims, 1 Drawing Sheet

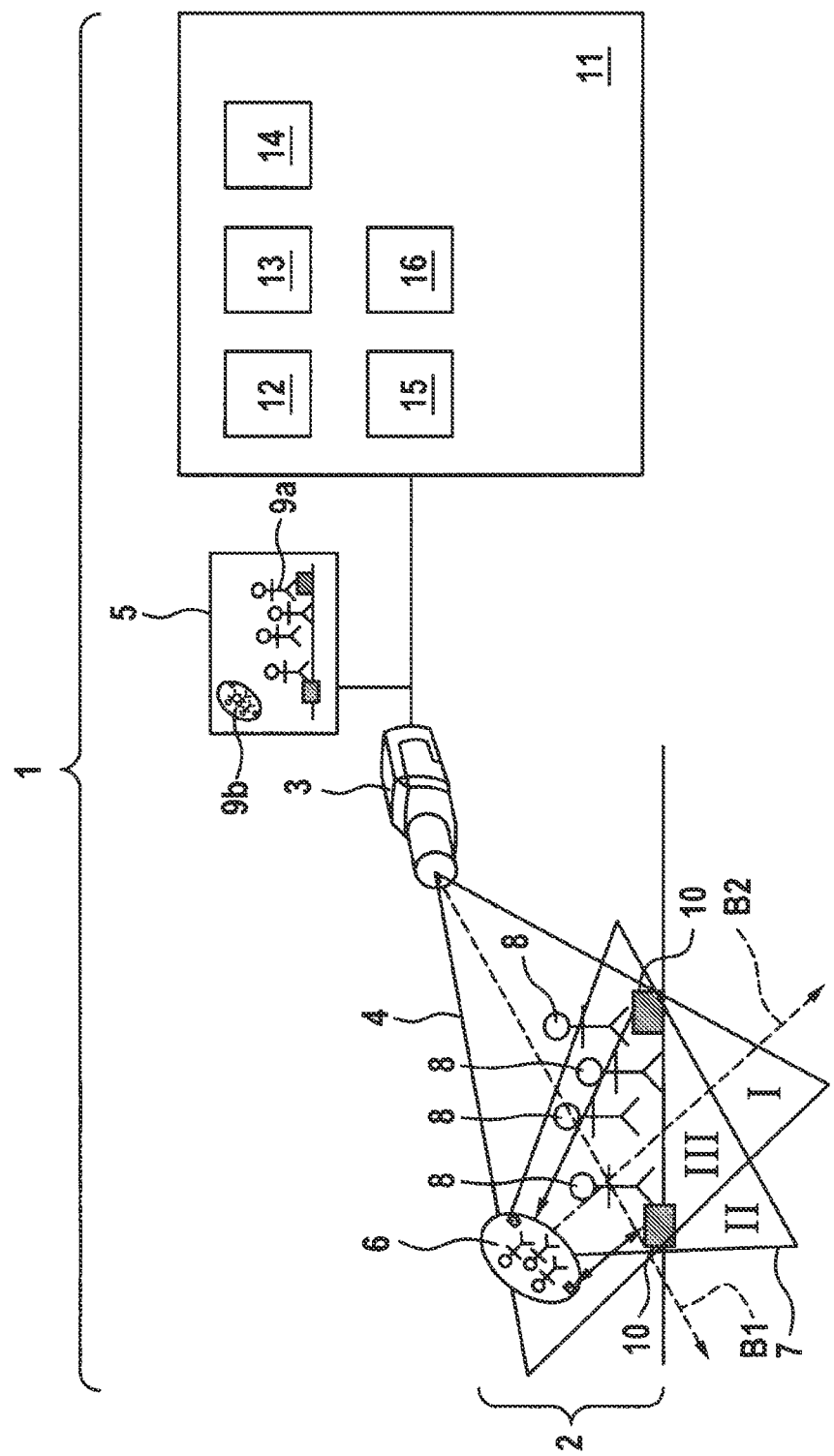

MONITORING SYSTEM COMPRISING A REFLECTING DEVICE AND CORRESPONDENCE MODULE AND METHOD FOR SETTING UP THE MONITORING SYSTEM

BACKGROUND OF THE INVENTION

The invention relates to a monitoring system for a monitoring area comprising a monitoring camera for outputting a monitoring image, wherein the monitoring camera has a field of view for capturing a first partial section of the monitored region, a reflecting device, the reflecting device being disposed in the field of view of the monitoring camera; thus enabling the monitoring camera to capture a second partial section of the monitored region via the reflecting device, wherein the first and the second partial section are disposed in a common partial section of the monitoring area so as to overlap, a first image region depicting the first partial section and a second image region depicting the second partial section, and comprising an evaluator for evaluating the monitoring image. The invention further relates to a method for setting up the monitoring system.

One or a plurality of cameras is typically used for the image supported monitoring of public and private areas in order to be able to sufficiently cover the monitoring areas. In so doing, an area of conflict arises with regard to the system-technical layout of the image supported monitoring. This is due to the fact that, on the one hand, the monitoring areas are to be covered to the greatest possible extent and, on the other hand, cameras do however induce costs resulting from the initial investment as well as the servicing thereof, the data-technical link, etc. The system-technical layout of the image supported monitoring is thus to be conceived in such a manner that as few cameras as possible are to be used and the monitoring area is nevertheless to be sufficiently observed.

A particular monitoring system in this connection is known from the Japanese patent publication JP 2012 235 482 A. In this publication, a monitoring system is disclosed which comprises only a single camera, wherein a mirror is however disposed in the field of view of the camera, the mirror being oriented in such a manner that the camera is able to observe the monitoring area by means of said mirror. As a result, the camera can monitor a first direction of observation and a second direction of observation, the first direction of observation being defined by the camera alignment and the second direction of observation being determined or codetermined by the alignment of the mirror. During the evaluation process, provision is made in the monitoring system for the image detail in the first direction of view to be processed with a first algorithm and the image detail in the second direction of view to be processed with a second algorithm in order to determine the number of people in the image details in each case independently of one another.

SUMMARY OF THE INVENTION

A monitoring system is proposed within the scope of the invention, which is designed to monitor a monitoring area. The monitoring system is particularly designed as an image supported, in particular video supported, monitoring system. The monitoring area can relate to private or public areas. The monitoring area can furthermore relate to areas of buildings or to open areas. It is thus within the scope of the invention for the monitoring area to constitute a street area, an area of an intersection, a public square, a soccer field, an airport, a train station, etc. Alternatively or in addition, the monitoring area can also constitute a factory, warehouse or public hall, a reading room, a library, a museum, a public building or private building, etc.

The monitoring system comprises at least or exactly one monitoring camera, which is used to output a monitoring image. The monitoring camera can be designed as a black and white camera or as a color camera. The monitoring camera can also be implemented as a so-called PTZ (pan-tilt-zoom) camera. The monitoring image can be configured as an individual image, as a sequence of individual images or as a part of a video.

The monitoring camera has a visual field which is also referred to as a field of view (FOV). The field of view is particularly configured as a cone which is symmetrically disposed about a viewing direction axis of the monitoring camera. The field of view of the monitoring camera is directed onto the monitoring area and captures a first partial section of the monitoring area. The first partial section is particularly the spatial intersection between the field of view and the monitoring area.

The monitoring system comprises a reflecting device which is designed to reflect light, in particular to generate a mirrored image. In particular, the reflecting device has at least one reflective surface. In a preferable manner, the reflective surface is designed straight, planar or flat. In alternative embodiments of the invention, it is, however, also possible for the reflective surface to be implemented in a curved fashion because any distortions resulting from the curvature can be calculated out of the monitoring image. The reflecting device is disposed in the field of view of the monitoring camera, in particular in the manner that the monitoring camera is directed onto the reflective surface. The monitoring camera captures a second partial section of the monitoring area via the reflecting device, in particular the reflective surface. Hence, especially a wider field of view results which is defined by the field of view of the monitoring camera and the orientation as well as the position of the reflecting device.

The monitoring camera and the reflecting device are disposed in such a manner that the first and the second partial section of the monitoring area overlap at least piecewise in a common partial section of the monitoring area. Sections of the monitoring area are thus disposed in the first and in the second partial section and thus in the common partial section.

In the monitoring image of the monitoring camera, the first partial section of the monitoring area is consequently depicted in a first image area and the second partial section of the monitoring area in a second image area. Provision can thereby be made for the second image area to be disposed along the edge in the monitoring image. Provision can, however, also be made for the second image area to be disposed in the first image area and particularly to be surrounded by said first image area. On the basis of this representation of the image areas, objects which are disposed in the first as well as in the second partial section and therefore in the common partial section are depicted in the first image area as well as in the second image area. In particular, at least or exactly two views of said objects are shown in the monitoring image. Notably the perspective and/or viewing direction is formed differently in the two image areas.

The monitoring system further comprises an evaluator for evaluating the monitoring image. The evaluator can particularly be designed as a digital data processing device. In particular, the evaluator implements a digital image processing. The evaluator can be disposed in the monitoring camera. Said evaluator can, however, also relate to a separate evaluation device which is connected to the monitoring camera for the purpose of data transmission.

It is proposed within the scope of the invention that the evaluator comprise a correspondence module which is designed to identify at least one correspondence object, in particular a corresponding or identical correspondence object, in the first as well as in the second partial section. An identical object is particularly identified as the correspondence object in the first and in the second partial section. The identification particularly takes place by means of evaluating the first and the second image area. The correspondence module is particularly designed to find the at least one correspondence object in the first and in the second partial section, for example by means of an object detection and to determine in each case a position, in particular a position in image coordinates and/or in world coordinates, for the at least one correspondence object. In a preferred modification to the invention, at least or exactly two, preferably at least or exactly three, correspondence objects are identified.

The identification of the at least one correspondence object is intended to ensure that the first partial section and the second partial section can be placed in a relative position with respect to one another which corresponds to the actual position in the monitoring area or models the actual position. Two independent partial sections are therefore no longer of concern, but rather their position relative to one another and or relative to the monitoring area is determined by means of the identification of the correspondence objects.

The correspondence module has the advantage that matrices, in particular transformation matrices, can, e.g., be constructed between the partial areas via the correspondences, so that, at an image point of an object in the first image area, the position of the object in the second image area and/or in the monitoring area can be calculated. On the basis of the correspondence module, it is especially possible to bring the image contents of the first and of the second image area and therefore the image contents of the first and the second partial sections in a content-related manner and/or spatially into relation and, on this basis, to create an improved evaluation of the monitoring image.

In a possible embodiment of the invention, the at least one correspondence object is configured as an object in the surrounding environment in the monitoring area. An arbitrary object is thus used. Such an arbitrary object can, for example, be identified by means of a pixel analysis or a feature analysis. This embodiment has the advantage that the correspondence object does not have to be additionally installed into the monitoring area.

In an alternative or additional form of the invention, the at least one correspondence object comprises a marker object as the correspondence object. The marker object is introduced as an artificial object into the monitoring area. For example, the marker object is designed as a marker, in particular as a cross. The marker object can, for example, be disposed at, in particular adhesively bonded to, the bottom of the monitoring area. In a particularly preferred manner, an image of the marker object is deposited as a reference in the correspondence module; thus enabling the identification of the marker object to be facilitated in the first and in the second partial section and/or in the first and in the second image area. Provision can be made in a modification to the invention for at least two similar marker objects, in particular at least three similar marker objects, to be disposed in the monitoring area for identification as correspondence objects.

In a preferred modification to the invention, the evaluator comprises an allocation module which is designed to determine a position of the first and the second partial section in the monitoring area on the basis of the identified, at least one correspondence object. Alternatively or in addition thereto, the position of the first partial section and the second partial section can also be determined relative to one another by means of the identified at least one correspondence object. In particular, the first and the second partial section are brought into a defined spatial position with respect to one another. As a result, the first partial section and the second partial section are disposed in a common coordinate system, wherein an object which is disposed in the common partial section can, on the one hand, be positioned in the common coordinate system and, on the other hand, can be observed via both partial sections.

In a preferred modification to the invention, the evaluator comprises an object detection module, which is designed to detect a monitoring object in the common monitoring section on the basis of a joint evaluation of the first and the second image area. A monitoring object is especially then detected if said object can be recognized in the first image area as well as in the second image area.

Alternatively or additionally, the evaluator comprises a verification module which is designed to detect a monitoring object in the common monitoring section by evaluating one of the image areas and to verify the monitoring object in the common monitoring section by evaluating the second image area. The monitoring object is, for example, detected by evaluating one of the image areas and the position thereof is determined in the common coordinate system. The verification module is designed, by evaluating the other image area, to check whether the monitoring object is located at the position in the common coordinate system.

Both of the embodiments mentioned above have the advantage that items of information from both partial sections and/or both image areas can be used for the object detection and/or object verification; thus enabling the data basis for the object detection and/or object verification to be improved.

In a possible modification to the invention, the evaluator comprises an object characterization module for the characterization of "a" or "the" monitoring object from the common monitoring area. In particular, a characterization of the monitoring object is temporarily or permanently stored in the object characterization module. The characterization comprises at least one optical feature, in particular an image feature, from the first image area and at least one optical feature, in particular an image feature, from the second image area. Optical features from both partial sections and/or image areas can also be used when characterizing the monitoring object; thus enabling the characterization to be more comprehensive and therefore more exact in comparison to a utilization of only one partial section/image area.

Provision is even made in a preferred modification to the invention for the characterization of the monitoring object to comprise an image detail of the first image area and an image detail of the second image area. As a result, the characterization of the monitoring object is more substantial when compared to a constellation in which the monitoring object is characterized by optical features which are gathered only from one perspective.

In one constructional design of the invention, the reflecting device can be formed by an already present mirror in the monitoring area. It is thus possible in a possible application for the reflecting device to be designed as a full-length mirror. A full-length mirror has a height of at least one meter and is disposed perpendicularly or substantially perpendicularly. As an alternative thereto, the reflecting device can be designed as a surveillance mirror at a checkout counter. Such surveillance mirrors are mounted to the ceiling and allow a cashier at the checkout counter to view into the shopping cart of a customer who is being served at the checkout from the vantage point of said cashier's work area.

Provision is made in a particularly preferable manner for the monitoring system to be disposed and aligned such that persons can simultaneously be detected as monitoring objects in a frontal view as well as in a side view.

A further subject matter of the invention relates to a method for setting up the monitoring system. The reflecting device comprising the reflective surface is positioned into the field of view of the monitoring camera in such a manner that said device enables a further perspective onto the monitoring area besides the camera perspective of the monitoring camera. In the method, at least one congruent and/or identical correspondence object is identified via the correspondence module in the first image area and therefore in the first partial section and in the second image area and therefore in the second partial section. The identification can, for example, be implemented during an initial set up or during an initialization. The identification can alternatively occur during a recalibration. The monitoring area is subsequently monitored with the monitoring system.

When setting up the monitoring camera in a preferred embodiment of the invention, the image of the reflecting device as the mirror region in the monitoring image as well as the correspondences between the correspondence objects, also referred to as landmarks, are indicated in the monitoring image and in the corresponding areas in the mirror region. As a result, a correspondence algorithm in the evaluator has information at its disposal which covers partial sections in the monitoring area of the reflecting device.

If a monitoring object is now detected in the field of view of the monitoring camera, this detection can be matched and thus verified by comparing it with available items of pixel information in the mirror region of the reflecting device. Conversely, the items of pixel information in the mirror region can supply clues about possibly present monitoring objects in the field of view of the monitoring camera. A significant improvement in the detection is to be expected particularly in the case of groups of people which are detected, for example, from the frontal perspective of the monitoring camera as well as from a perspective of the reflecting device which is acquired to the greatest possible extent from the side.

Particular advantages result from the fact that a high resolution can also be achieved in the second partial section and/or in the second image area by the use of monitoring cameras having very high resolution, as said cameras are cost effectively available on the market. An improved detection of monitoring objects can be achieved because the image information mirrored in the reflecting device can be used in order, for example, to provide a detection algorithm in the detection device with further items of information from another perspective. It is advantageous for the monitoring operation that a person who is being monitored, is in fact aware of the monitoring camera but, however, not of the reflecting device. It is thus possible for the monitored person to carry out certain (illicit) activities which cannot be recognized in the first partial section of the monitoring area but which can be seen by means of the second partial section. In addition, the algorithms are simplified in comparison to a multi-camera system because a temporal synchronization between different cameras of the multi-camera system does not have to be produced. All items of information are disposed at the same point in time on the same monitoring image. Together with this is the further advantage that no network traffic arises and therefore a latency cannot occur between the items of information from the different perspectives. Finally, mirrors can be utilized as reflecting devices, which are used by cashiers in super markets, for example at checkout counters, in order to look into the shopping carts or in aisles in order to look around the corner.

BRIEF DESCRIPTION OF THE DRAWINGS

Further features, advantages and effects of the invention ensue from the following description of a preferred embodiment of the invention as well as from the attached drawing. In the drawing:

FIG. 1 shows a schematic depiction of the monitoring system as an exemplary embodiment of the invention.

DETAILED DESCRIPTION

FIG. 1 shows a monitoring system 1 which is used to monitor a monitoring area 2 in a schematic block diagram. The monitoring area 2 can be part of a public or a private area. The monitoring area 2 can, for example, form a section of a super market or of a public square.

The monitoring system 1 comprises a monitoring camera 3 which has a field of view 4 in a first direction of view B1. The field of view 4 is configured as a straight cone about the first direction of view B1. In a usual manner, the field of view 4 can, for example, be changed by adjusting a lens of the monitoring camera 3. The field of view 4 of the monitoring camera 3 forms a first partial section 1 of the monitoring area so that said partial section is depicted on the monitoring image 5 of the monitoring camera 3.

A reflecting device 6 is disposed in the monitoring area 2 as a part of the monitoring system 1. The reflecting device 6 relates, for example, to a mirror. This can relate to an additional mirror which is installed separately from the layout of the monitoring system 1 or to a mirror which, in any case, is present in the monitoring area 2 and takes on at least one further function. The mirror can particularly be designed as a full-length mirror or as a checkout counter mirror.

The reflecting device 6 is disposed in the field of view 4 of the monitoring camera 3 such that a second partial section II of the monitoring area 2 results from the reflection at the reflecting device 6, wherein said second partial section II can be observed via the reflecting device 6. The second partial section II is particularly formed by a field of view of the mirror 7. The second partial section II and/or the field of view of the mirror 7 has a second direction of observation B2. The first direction of observation B1 and the second direction of observation B2 are disposed in a skewed manner with respect to each other in the most general configuration of the exemplary embodiment. The first and the second direction of observation B1 and B2 intersect approximately perpendicularly in the lateral top view of the monitoring system 1 shown in the drawing.

The first and the second partial section I, II overlap in the monitoring area 2 in a common partial section III such that monitoring objects 8—in this example people—which are located in the common partial section III are depicted on the monitoring image 5 directly by means of the first field of view 4 as well as indirectly via the reflecting device 6 in the field of view of the mirror 7. The monitoring objects 8 are therefore shown twice in the monitoring image 5, namely once by the direct acquisition and once by the acquisition via the reflecting device 6. As a result, a first image area 9*a*, which depicts the first partial section I, and a second image area 9*b*, which depicts the second partial section II, appear in the monitoring image 5. The two image areas are simultaneously disposed in the same monitoring image 5.

Correspondence objects 10 (so-called landmarks), in this case two correspondence objects 10, are disposed in the monitoring area 2, said correspondence objects being positioned in the common partial section III. The correspondence objects 10 are particularly configured as marker objects and can, for example, be implemented as adhesive markings at the bottom of the monitoring area 2. The correspondence objects 10 particularly display simple geometric forms, such as, for example, a cross or a circle or a combination thereof or a particularly specific color which otherwise does not or seldom appears in the monitoring area 2, such as, for example, luminous red, luminous yellow, etc. The correspondence objects 10 can be easily identified by means of digital image processing as a result of their particular configuration.

The monitoring camera 3 is connected to the evaluator 11 by means of a data-technical link, wherein the monitoring image(s) 5 are transmitted from the monitoring camera 3 to the evaluator 11.

The evaluator 11 comprises a correspondence module 12. The correspondence module 12 is designed to identify the correspondence objects 10 in the first image area 9*a* as well as in the second image area 9*b* of the monitoring image 5 on the basis of a digital image processing. When identifying the correspondence objects 10, the positions of said correspondence objects 10 in the monitoring image 5 are particularly determined in the first image area 9*a* as well as in the second image area 9*b*.

The first image area 9*a* and the second image area 9*b* form different perspectives onto the monitoring area 2, in particular onto the common partial area III. The identification of the correspondence objects 10 ensures that the two image areas 9*a, b* and therefore the two partial sections I, II can be set into a spatial relationship to each other within the dimensions of the common partial section III. Matrices can, for example, be calculated which implement a coordinate transformation from the image coordinates of the first and the second image area 9*a, b* into a common world coordinate system. As a result of the correspondence module 12, the basis is therefore laid for jointly evaluating the image areas 9*a, b* using data technology and for not having to treat said image areas as two separate and independent images.

The evaluator 11 particularly comprises an allocation module 13 which is designed to determine a position of the first partial section I and/or a position of the second partial section II in the monitoring area 2 by means of the identified correspondence objects 10 or, respectively, the positions thereof. As an alternative thereto, the position of the first partial section I and the position of the second partial section II are determined in relation to one another.

Provision can be made for the monitoring system 1, in particular the evaluator 11, to comprise an object detection module 14 which detects one of the monitoring objects 8 on the basis of a joint evaluation of the first and the second image area 9*a, b*. As a result, criteria, in particular with regard to object detection, which relate to correlations in the first image area 9*a* as well as to correlations in the second image area 9*b* are used.

In another option of the exemplary embodiment, the evaluator 11 comprises a verification module 15 which operates in a two-stage manner: In a first stage, one of the monitoring objects 8 is detected in one of the image areas 9*a* or 9*b*; and in a second stage, the detected monitoring object 8 is verified in the other image area 9*b* respectively 9*a*. In so doing, the joint evaluation of the first and the second image area 9*a, b* is implemented as a serial analysis within the scope of the detection of a monitoring object 8.

The evaluator 11 optionally comprises an object characterization module 16, which comprises characterizations of the monitoring object 8. Provision is thereby made for optical features to be used in the characterization of the monitoring object, wherein at least one optical feature from the first image area 9*a* and at least one optical feature from the second image area 9*b* are included in the characterization for a monitoring object 8 in the common partial section III. The characterization of one of the monitoring objects 8 particularly comprises an image detail of the first image area 9*a* and an image detail of the second image area 9*b*, wherein each of the image details shows a portion of the monitoring object 8.

The invention claimed is:

1. A monitoring system (1) for monitoring an area (2), the monitoring system (1) comprising:
   a monitoring camera (3) for outputting a monitoring image (5), the monitoring camera (3) having a field of view (4) for capturing a first partial section (I) of the monitoring area (2),
   a reflecting device (6) positioned in the field of view (4) of the monitoring camera (3), the monitoring camera (3) capturing a second partial section (II) of the monitoring area (2) via said reflecting device (6),
   wherein the first and the second partial sections (I, II) are disposed so as to overlap in a common partial section (III) of the monitoring area (2),
   wherein a first image area (9*a*) depicts the first partial section (I) and a second image area (9*b*) depicts the second partial section (II) in the monitoring image (5), and
   an evaluator (11) for evaluating the monitoring area (5), the evaluator (11) comprising a correspondence module (12), the correspondence module (12) configured to identify at least one correspondence object (10) in the first and the second partial sections (I, II).

2. The monitoring system (1) according to claim 1, wherein the at least one correspondence object (10) is configured as an object in the surrounding environment in the monitoring area (2).

3. The monitoring system (1) according to claim 1, wherein the at least one correspondence object (10) is a marker object.

4. The monitoring system (1) according to claim 1, wherein the evaluator (11) comprises an allocation module (13), the allocation module (13) configured to determine a position of the first partial section (I) and/or a position of the second partial section (II) in the monitoring area (2) and/or relative to one another via the identified at least one correspondence object (10).

5. The monitoring system (1) according to claim 1, wherein the evaluator (11) comprises an object detection module (14), the object detection module (14) configured to detect a monitoring object (8) in the common monitoring section (III) on the basis of a joint evaluation of the first and the second image area (9*a, b*).

6. The monitoring system (1) according to claim 1, wherein the evaluator (11) comprises a verification module (15), the verification module (15) configured to verify a monitoring object (8) in the common monitoring section (III), which was detected by evaluating one of the image areas (9*a, b*), by evaluating the other image area (9*b, a*).

7. The monitoring system (1) according to claim 1, wherein the evaluator (11) comprises an object characterization module (16) for characterizing a monitoring object (8) from the common monitoring area (III), the characterization comprising at least one optical feature from the first image area (9*a*) and at least one optical feature from the second image area (9*b*).

8. The monitoring system (1) according to claim 7, wherein the characterization comprises an image detail of the first image area (9*a*) and an image detail of the second image area (9*b*).

9. The monitoring system (1) according to claim 1, wherein the reflecting device (6) is designed as a full-length mirror in a retail store or as a surveillance mirror at a checkout counter.

10. The monitoring system (1) according to claim 1, wherein the monitoring camera (3) and the reflecting device (6) are positioned relative to the monitoring area (2) such that persons as monitoring objects in the common partial section (III) are captured from the front in the first partial section (I) and from the side in the second partial section (II).

11. A method for setting up a monitoring system (1) according to claim 1, wherein at least one correspondence object (10) is identified via the correspondence module (12) in the first partial section and in the second partial section.

* * * * *